US009324047B2

(12) United States Patent
Lerenc

(10) Patent No.: US 9,324,047 B2
(45) Date of Patent: Apr. 26, 2016

(54) LOCATION-BASED CARPOOL SURVEY TRIGGER

(71) Applicant: Vedran Lerenc, Schoenau (DE)

(72) Inventor: Vedran Lerenc, Schoenau (DE)

(73) Assignee: SAP SE, Walldorf (DE)

( * ) Notice: Subject to any disclaimer, the term of this patent is extended or adjusted under 35 U.S.C. 154(b) by 4 days.

(21) Appl. No.: 13/749,083

(22) Filed: Jan. 24, 2013

(65) Prior Publication Data
US 2014/0206393 A1    Jul. 24, 2014

(51) Int. Cl.
*H04W 24/00*  (2009.01)
*G06Q 10/06*  (2012.01)
*H04W 4/02*  (2009.01)

(52) U.S. Cl.
CPC ........... *G06Q 10/06311* (2013.01); *H04W 4/02* (2013.01); *H04W 4/027* (2013.01)

(58) Field of Classification Search
CPC . H04W 4/02; H04L 29/08072; G10L 15/265; G06Q 30/02; G06Q 10/063112; G06F 3/0488; G01C 21/26; G08G 1/123; G08G 1/0104
USPC ........... 455/456.3; 704/235, 275; 705/1.1, 14, 705/7.32; 345/173; 701/465, 117, 468, 517; 709/203
See application file for complete search history.

(56) References Cited

U.S. PATENT DOCUMENTS

| 5,942,988 | A | * | 8/1999 | Snyder et al. | 340/12.22 |
|---|---|---|---|---|---|
| 6,161,097 | A | * | 12/2000 | Glass et al. | 705/6 |
| 6,208,269 | B1 | * | 3/2001 | Brodie et al. | 455/3.01 |
| 6,922,147 | B1 | * | 7/2005 | Viksnins et al. | 340/573.1 |
| 7,647,241 | B1 | * | 1/2010 | Lilly et al. | 705/7.26 |
| 2006/0155460 | A1 | * | 7/2006 | Raney | 701/207 |
| 2008/0214360 | A1 | * | 9/2008 | Stirling et al. | 482/9 |
| 2010/0145765 | A1 | * | 6/2010 | Kantarek | 705/10 |
| 2012/0226434 | A1 | * | 9/2012 | Chiu | 701/117 |
| 2012/0233246 | A1 | * | 9/2012 | Guemez | 709/203 |
| 2013/0035846 | A1 | * | 2/2013 | Shih-Chia et al. | 701/408 |
| 2013/0158869 | A1 | * | 6/2013 | Lerenc | 701/527 |

* cited by examiner

*Primary Examiner* — Charles Appiah
*Assistant Examiner* — Alexander Yi
(74) *Attorney, Agent, or Firm* — Kenyon & Kenyon LLP

(57) ABSTRACT

A portable computing device of a carpool participant may include functionality enabling a mobile application executed on the device to detect an appropriate end of a carpool for a respective participant. Once the end of the carpool is detected for a particular carpool participant, the mobile application may automatically generate and present a carpool survey to the participant on the participant's mobile device. The survey may be presented and feedback collected immediately once the carpool has concluded for each participant using movement and/or location based technologies included in the mobile computing device. Mobile computing devices, methods, and computer readable media are provided.

34 Claims, 3 Drawing Sheets

LOCATION-BASED CARPOOL SURVEY TRIGGER

BACKGROUND

Surveys have been commonly used as a source of feedback. Some entities have distributed surveys to their customers to assess customer satisfaction and better understand customer needs. In the case of automatically arranged carpools, participant surveys can provide important information and feedback about a carpool to other prospective participants considering whether to participate in a particular carpool. For example, surveys may provide feedback about whether the driver and/or other participants were punctual, friendly, talkative, or played loud or annoying music. Surveys may also provide feedback about whether a vehicle was clean, driven safely, or in good condition.

Existing survey systems have asked customers to provide feedback by e-mail or through an Internet-based web survey that a client has to actively call up to give her or his rating. Responding to these surveys may require extra effort on the part of the participant by searching for and then responding to an email or loading a webpage containing the survey. If the participant does not respond to the survey shortly after participating in the carpool, then it is more likely that the participant will be distracted or engaged in other activities reducing the likelihood that the participant will later make the extra effort respond to the survey. As a result, participants having a positive or neutral experience in the carpool may be less likely to respond to the survey. On the other hand, participants with a negative experience may be more inclined to respond to the survey to voice their frustration.

There is a need for distributing carpool surveys in a manner that increases the survey response rate to reflect an overall satisfaction rate and avoid a negative feedback bias.

DETAILED DESCRIPTION

Figure 1:
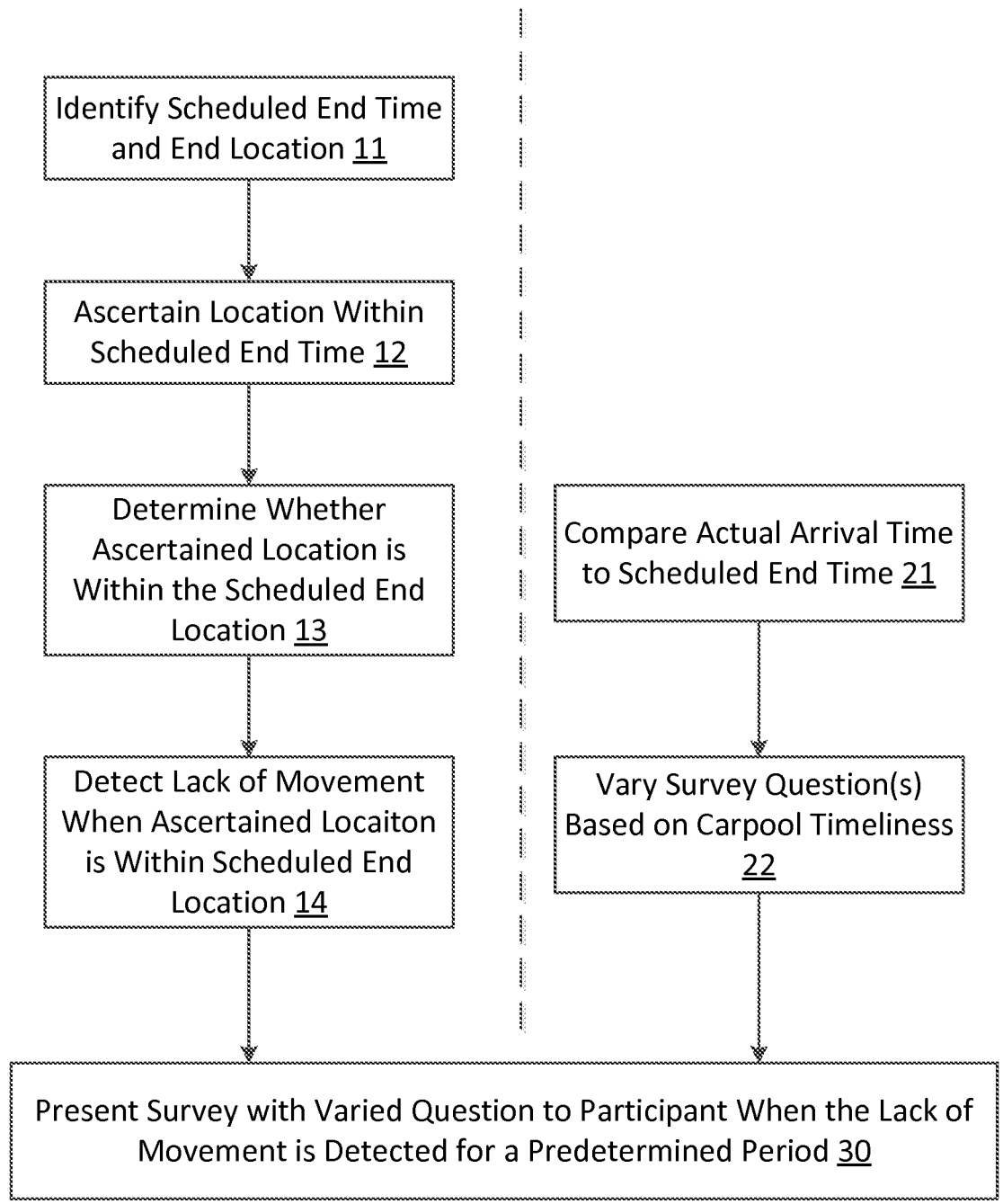
FIG. 1 shows a first exemplary process for triggering a survey at an end of a carpool on a mobile computing device.

A mobile application may be downloaded or otherwise executed at portable computing devices of carpool participants. The mobile application and the portable computing device may include functionality enabling the mobile application to detect an appropriate end of a carpool for a respective participant. Once the end of the carpool is detected for a particular carpool participant, the mobile application may automatically generate and present a carpool survey to the participant on the participant's mobile device. Thus, the survey may be presented and feedback collected immediately once the carpool has concluded for each participant. Additionally, the survey may automatically pop-up and may, but need not, include only a single question to make it easy for the participant to quickly provide immediate feedback with minimal inconvenience.

In some instances, the survey may ask the participant to provide a simple thumbs up or down about the carpool that just ended. In other instances, the survey may include one or more questions that are customized depending on various events relating to the carpool. For example, if the mobile application determines that the car was late, a question could be asked about the lateness, such as the cause of the lateness, the amount of traffic, whether there was an accident. If the mobile application determines that the car was on time, then the lateness question need not be presented to the participant. If the car was early, a question may be asked about the earliness, such as the amount of traffic, the speed of car, and so on.

In other instance, the survey may include multiple questions or more detailed questions asking about the other participants, the driver, the condition of the car, if there were any extra people, pets, or unscheduled stops, and so on.

The mobile application may be configured to automatically notify the participant or automatically present the survey to the participant at the planned, scheduled, expected, or actual end of the ride. In some instances the mobile application may rely on location based services provided with the mobile computing device, such as a global positioning sensor "GPS" technology, known Wi-Fi hotspots in the vicinity of the mobile computing device, triangulation algorithms, and so on. Using location based services may result in a more accurate determination of the end of the carpool for a participant and may avoid an undesirable situation in which the participant is asked to rate the carpool while the participant is still in the carpool. Not only is this situation undesirable, but in some instances it may also be unsafe to disturb the driver of the carpool enroute to a particular location.

Additionally, to conserve battery power, the mobile application may also be configured to reduce the use of location based services. For example, instead of continuously checking the location of mobile computing device, the application may be configured to set limits on the frequency and/or timing of the location checks. In some instance, the application may be configured to check the location of the device only within a predetermined time window around a scheduled end of the carpool for the participant. The predetermined time window, may, in one non-limiting example, be around 5, 10, 15, 20, 35, or 30 minutes before and/or after the scheduled end of the carpool for the participant. Once a determination has been made that the mobile computing device has reached the end location for the participant, further location checks need not occur.

Instead of a preset time, the predetermined time window may also be based on an expected completion percentage of the carpool, a waypoint arrival time, or other criteria. These criteria and other criteria, such as an expected percentage completion of the planned carpool ride time, may be used in carpools involving longer distances that may last hours or in carpools that may involve substantial delays such as in one example delays of one hour or more.

Once the application determines that the mobile computing device has reached the end location for the participant, a movement device in the mobile computing device may be used to detect movement of the mobile computing device. If the signals from the movement device indicate that the mobile computing device hasn't moved within a predetermined period, then the survey may be presented to the user on the mobile computing device and the user may be asked to complete the survey. The predetermined period may correspond, in one non-limiting example, to the time associated with leaving a car, which may be in some instances about 10 seconds. In other instances, the predetermined period may be selected based on other user selected criteria, such as a time to walk to a particular destination or complete a particular activity.

The mobile computing device may determine that it has reached an end location for the participant when the location of the device is within a predetermined vicinity of the scheduled end location of the participant. In some instances, the predetermined vicinity may be fixed to a particular range, such as within 300 meters of the scheduled end location in one non-limiting example, but in other instances vicinity may vary depending on the resolution of the location based services technology used to determine the location.

In instances when the location resolution of the location based services technology is too low, such as because a global positioning system sensor is not active or functioning, motion may be detected with the help of other movement sensing devices in the mobile devices, such as accelerometers, gyroscopes, and so on. A noise filter may be applied to signals from these movement sensors. If, after applying the noise filter, the signals show no force other than the earth's gravitational force, the application may assume that the car has stopped. If this situation occurs within a vicinity of the scheduled end location of the participant, the application may assume that the participant has arrived at the end location, at which time the application may trigger the presentation of the survey for participant feed back.

Figure 2:
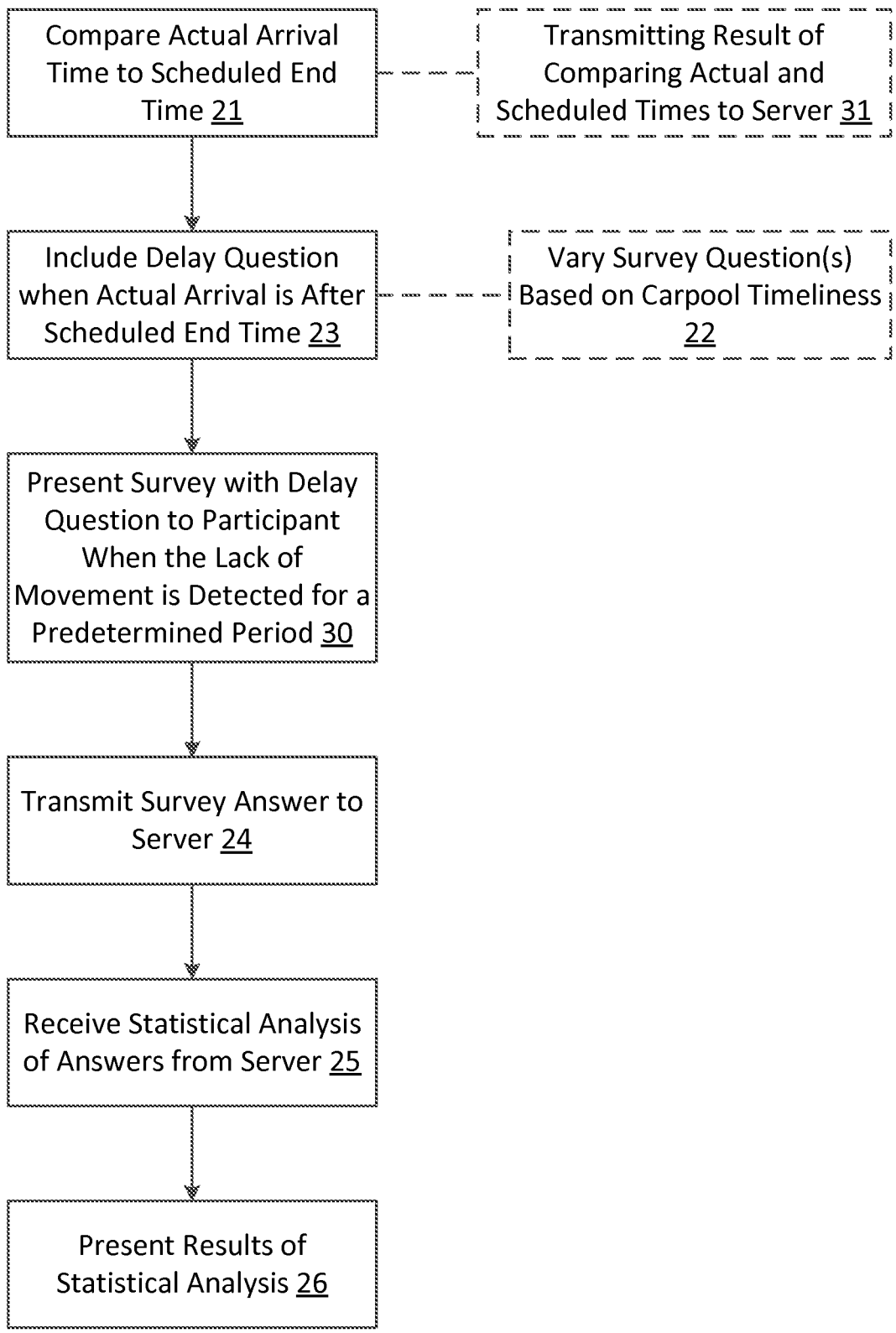
FIG. 2 shows a second exemplary process for triggering a survey at an end of a carpool on a mobile computing device.

FIGS. 1 and 2 show exemplary processes for triggering a survey at an end of a carpool on a mobile computing device. A processing device, a movement device, and/or a location device of the mobile computing device may be configured to execute one or more features of the process in some instances. In some instances a computer readable medium of the mobile computing device may store instructions, that when executed by one or more components of the mobile computing device, cause the mobile computing device to perform the process.

In box 11, a scheduled end time and a scheduled end location for a carpool participant may be identified from stored carpool scheduling data. The carpool scheduling data may be stored in a memory of the mobile computing device. Some or all of the data may also be stored remotely and transmitted to mobile computing device, which may identify the schedule end time and location in the transmitted data.

In box 12, a location of the mobile computing device of the carpool participant may be ascertained within a predetermined time of the scheduled end time. In some instances, the location of the mobile computing device may be ascertained using a location based service or other automatic location identification technologies. For example, techniques such as control plane locating, GSM localization, near location based services (NLBS), and triangulation may be used in some instances. A global positioning system sensor in the mobile computing device may be used in some instances to ascertain the location of the mobile computing device.

In box 13, a determination may be made as to whether the ascertained location is within the scheduled end location. The ascertained location may be considered to be at or within the scheduled end location when the ascertained location is within a predetermined distance or vicinity of the scheduled end location. For example, if the ascertained location is within a predetermined distance, such as, in one non-limiting example, 300 meters of the end location, then the participant and their mobile computing device may be presumed to be at the scheduled end location.

This predetermined distance may be selected based on a resolution of the position locating technology being used to ascertain the location to account for accuracy errors or for trivial changes to the end location of the carpool (such as in a different parking area of an office or at main entrance or side entrance instead). The predetermined distance may also be adjusted based on other factors, such as a relative size of the end location (for example, a sprawling multi-building campus or a single house), a topography around the end location that may affect the accuracy of a measurement, and the functions and limitations of the mobile computing device.

When the ascertained location is determined to not be within the scheduled end location, an estimated time to reach the scheduled end location based on a distance from the ascertained location may be calculated. A location of the mobile computing device may then be reascertained based on this calculated estimated time.

In some instances, the ascertaining of the location of the mobile computing device may be repeated at predetermined intervals until the ascertained location is the scheduled end location.

In box 14, detection for a lack of movement of the mobile computing device for a predetermined period may begin after the ascertained location is within the scheduled end location using a movement sensor. The detection of the lack of movement may be based on data from a location sensor in the mobile computing device, a movement sensor in the mobile computing device, and/or data from a location based services system supplying location information to the mobile computing device. For example, in some instances, the lack of movement of the mobile computing device may be detected using an accelerometer in the mobile computing device when a location resolution of the location based service is unable to detect the lack of movement of the mobile computing device.

In some instances, the signal from a location or movement sensor may be filtered through a noise reduction filter. The filtered signal may be compared to a sample signal representative of a gravitational force of the earth or other sample signal. A lack of movement of the mobile computing device may then be detected when the filtered signal corresponds to the sample signal.

In box 21, an actual arrival time at the scheduled end location may be compared to the scheduled end time. The comparison may be used to determine whether the carpool has arrived early, on time, or late. Different survey questions may be asked to the participant depending on whether the carpool was early, on time, or late.

A result of the comparing of the actual arrival time at the scheduled end location to the scheduled end time may be included in the survey as part of the survey data that transmitted to a server receiving survey responses. In instances where the result is included in the survey, the result may, but need not, be made visible in some for to the participant or the participant may otherwise be made aware of the result. In other instances the result need not be presented to the participant.

The result of the comparing in box 21 may be transmitted to the server receiving survey responses. In some instances, the result may be transmitted as part of or with the participant's responses to the survey. In other instances, the result may be transmitted independently, such that the server receives the result of the comparing in box 21, even if the participant does not answer the survey.

In box 22, one or more questions on the survey may be varied based on a timeliness of the carpool from the comparing. For example, in box 23, the participant may be questioned about a source of delay in the survey only when the actual arrival time exceeds the scheduled end time by more than a predetermined delay.

In box 30, the survey with the varied question in box 22 may be presented to the participant on the mobile computing device when the lack of movement is detected for the predetermined period in box 14. The survey may be presented to the participant by displaying the survey on a screen, reading the survey to the participant, or otherwise making the participant aware of the survey.

In box 24, a participant supplied answer to the presented survey may be transmitted from the mobile computing device to a server. The server may then store the answer in a database or other data source. The answers from multiple carpool participants may be aggegrated and/or analyzed in an aggregate form based on varying criteria, such as by participant, route, time, destination, or other criteria. The answers may be analyzed by applying logical and/or statistical functions to the answers in order to obtain a particular result. A result of a particular analysis requested by the mobile computing device may also be transmitted back the mobile computing device.

In box 25, the mobile computing device may receive from the remote server a result of a statistical analysis of multiple participant supplied answers transmitted to the server by different participants.

In box 26, the received result of the statistical analysis may be presented to the participant on the mobile computing device. The result may be presented to the participant by displaying the result on a screen, reading the result to the participant, or otherwise making the participant aware of the result.

In some instances, a user of the mobile computing device may submit a request to participate in a carpool. In such an instance, the mobile computing device may, if a suitable carpool is available, present the participant with an option for carpooling corresponding to the user's request. In addition to presenting the participant with one or more carpooling options for the user to choose, the mobile computing device may also receive from the remote server a result of a statistical analysis of multiple participant supplied answers pertaining to the one or more carpooling options presented to the user.

This information may be useful to the user when deciding which carpool option among many to select based on the feedback provided by prior carpool participants as reflected in the result of the statistical analysis. The user may then be presented with the result and a choice of whether to accept the option.

In instances where the user or participant is presented with multiple options for carpooling, the mobile computing device may receive from the remote server the result of the statistical analysis of each of the presented carpooling options. The presented carpooling options may be hierarchically arranged based on the respective results.

In some instances, those carpool options with respective results that do not satisfy a minimum result threshold may not be presented to the participant. In other instances, only those carpool options with respective results that satisfy a minimum result threshold may be presented to the participant. In some instances, the participant may only be presented with a pre-determined quantity of the top hierarchically arranged carpooling options.

Figure 3:
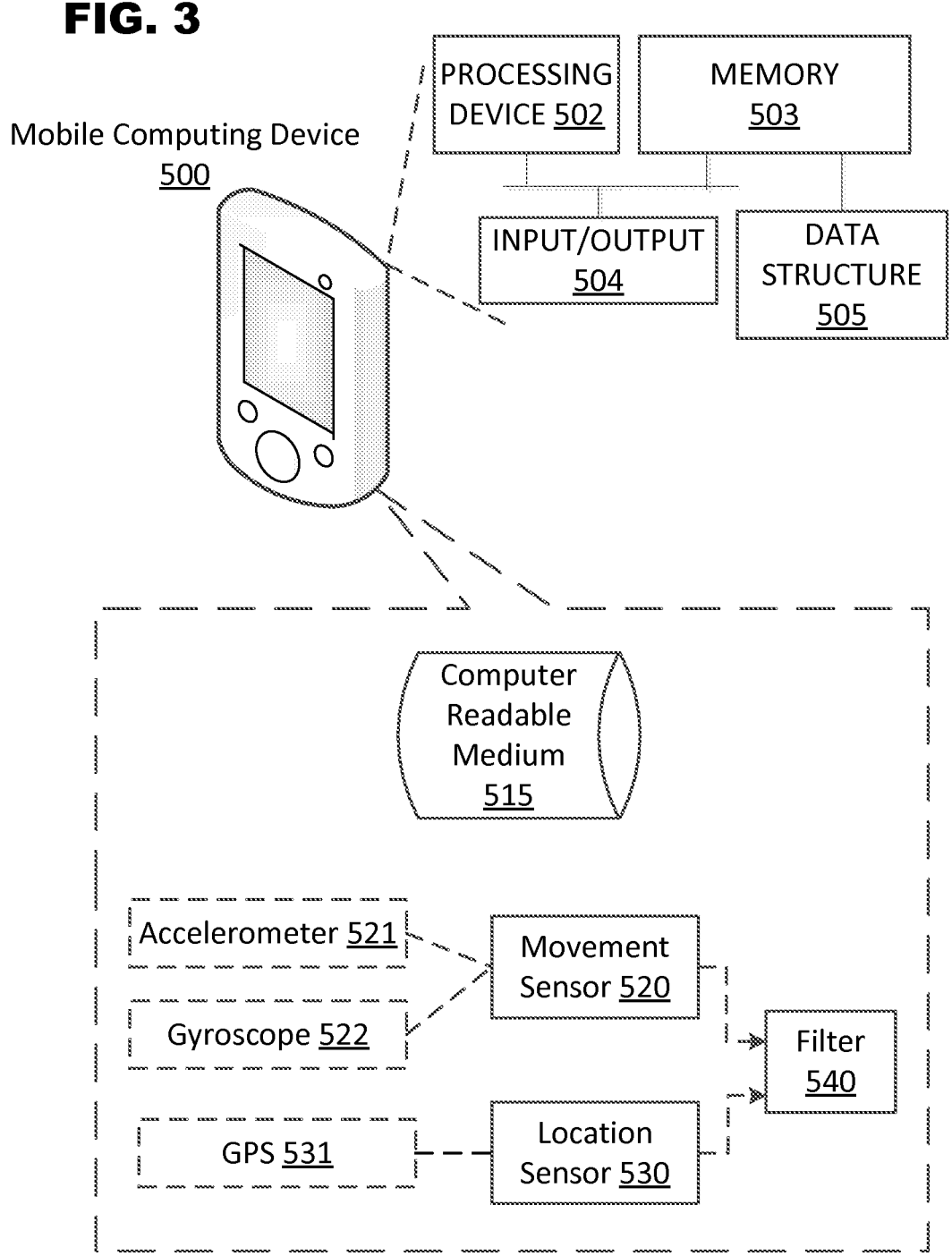
FIG. 3 shows an exemplary architecture of a mobile computing device.

FIG. 3 shows an exemplary architecture of a mobile computing device. A mobile computing device 500 may include a processing device 502, computer readable memory 515, movement sensor 520, location sensor 530, and/or filter 540.

The movement sensor 520 may detect a lack of movement of the mobile computing device 500 for a predetermined period. The movement sensor 520 may include an accelerometer 521, gyroscope 522, or other sensor capable of detecting movement.

The location sensor 530 may provide data used to ascertain a location of the mobile computing device 500. The location sensor 530 may include a global positioning system sensor 531 or other local based services sensor providing data used to ascertain a location of the mobile computing device 500.

Filter 540 may be a noise reduction filter that reduces signal noise of signals from at least one of the movement sensor 520 and the location sensor 530. Different types of noise reduction filters 540 may be used depending on the particular application. For example, in some instances low pass filters, linear smoothing filters, median filters, and/or anisotropic filters may be used but in other instances other filter may be used.

The processing device 502 may be configured to identify a scheduled end time and a scheduled end location for a carpool participant from carpool scheduling data. The processing device 502 may also determine whether an ascertained location of the mobile computing device of the carpool participant within a predetermined time of the scheduled end time is within the scheduled end location. The processing device 502 may also compare an actual arrival time at the scheduled end location to the scheduled end time, and may present a carpool survey to the participant on the mobile computing device when the lack of movement is detected for the predetermined period after the ascertained location of the mobile computing device is determined to be within the scheduled end location.

In addition to including a processing device 502, the mobile computing device 500 may also include a memory 503 storing loaded data or a loaded data structure 505, and an input/output interface 504, all of which may be interconnected via a system bus.

The output interface 504 may include an interface for presenting the survey, results, and/or other information to the participant. The output interface 504 may connect to a display screen, a printer, or another computing device. The output interface 504 may enable communications between the mobile computing device 500 and other devices connected to the interface 504.

Mobile computing device 500 may have an architecture with modular hardware and/or software systems that include additional and/or different systems communicating through one or more networks. The modular design may support additions, exchanges, and upgrades to the mobile computing device 500, including the addition of components from different vendors in some embodiments.

In an embodiment, memory 503 may contain different components for retrieving, presenting, changing, and saving data and may include the computer readable medium 515. Memory 503 may include a variety of memory devices, for example, Dynamic Random Access Memory (DRAM), Static RAM (SRAM), flash memory, cache memory, and other memory devices. Additionally, for example, memory 503 and processing device(s) 502 may be distributed across several different computers that collectively comprise a system.

Processing device 502 may perform computation and control functions of a system and comprises a suitable central processing unit (CPU). Processing device 502 may include a single integrated circuit, such as a microprocessing device, or may include any suitable number of integrated circuit devices and/or circuit boards working in cooperation to accomplish the functions of a processing device. Processing device 502 may execute computer programs, such as object-oriented computer programs, within memory 503.

The foregoing description has been presented for purposes of illustration and description. It is not exhaustive and does not limit embodiments of the invention to the precise forms disclosed. Modifications and variations are possible in light of the above teachings or may be acquired from the practicing embodiments consistent with the invention. For example, although the computer readable medium 515 is shown as separate from the memory 503, in some instances the memory 503 may include computer readable medium 515 but in other instances the computer readable medium 515 may be separate from memory 503 or distributed over two or more systems that are configured to appear as a functionally integrated single mobile computing device 500.

I claim:

1. A method for triggering a survey at an end of a carpool on a mobile device, the method performed by the mobile device and comprising:
   identifying a scheduled end time and a scheduled end location for a carpool participant from stored carpool scheduling data;
   ascertaining a location of the mobile device of the carpool participant within a predetermined time of the scheduled end time;
   determining that the carpool has been completed for the participant based on whether the ascertained location is within a predetermined distance of the scheduled end location;
   comparing an actual arrival time of the completed carpool at the scheduled end location to the scheduled end time;
   determining a timeliness of the completed carpool based on the comparing;
   selecting a question on the survey based on the determined timeliness of the completed carpool;
   detecting a lack of movement of the mobile device for a predetermined time period after the ascertained location is within the predetermined distance of the scheduled end location using a movement sensor; and
   displaying the survey with the selected question to the participant on a display screen of the mobile device in response to the lack of movement being detected for the predetermined time period.

2. The method of claim 1, further comprising:
   questioning the participant about a source of delay in the survey only when the actual arrival time of the completed carpool exceeds the scheduled end time by more than a predetermined delay;
   transmitting a participant supplied answer to the presented survey from the mobile device to a server;
   receiving from the remote server a result of a statistical analysis of multiple participant supplied answers transmitted to the server by different participants; and
   presenting the result of the statistical analysis to the participant on the mobile computing device.

3. The method of claim 2, further comprising:
   responsive to a participant request to carpool, presenting the participant with an option for carpooling corresponding to the request;
   receiving from the remote server the result of the statistical analysis of multiple participant supplied answers pertaining to the presented carpooling option; and
   presenting the participant with the result and a choice of whether to accept the option.

4. The method of claim 3, further comprising:
   presenting the participant with multiple options for carpooling;
   receiving from the remote server the result of the statistical analysis of each of the presented carpooling options; and
   hierarchically arranging the presented carpooling options based on the respective results.

5. The method of claim 4, further comprising not presenting any carpool options with respective results that do not satisfy a minimum result threshold.

6. The method of claim 4, further comprising presenting only those carpool options with respective results that satisfy a minimum result threshold.

7. The method of claim 4, further comprising presenting the participant with only a predetermined quantity of the top hierarchically arranged carpooling options.

8. The method of claim 1, further comprising:
   including a result of the comparing of the actual arrival time at the scheduled end location to the scheduled end time in the survey; and
   responsive to the participant responding to the presented survey, transmitting the survey with the participant response and the included result of the comparing to a server.

9. The method of claim 1, further comprising ascertaining the location of the mobile device using a location based service.

10. The method of claim 9, further comprising ascertaining the location of the mobile device using a global positioning system sensor in the mobile device.

11. The method of claim 9, further comprising ascertaining the location of the mobile device using an automatic location identification technology.

12. The method of claim 9, further comprising detecting the lack of movement of the mobile device using an accelerometer in the mobile device when a location resolution of the location based service is unable to detect the lack of movement of the mobile device.

13. The method of claim 12, further comprising:
   noise filtering a signal from the accelerometer;
   comparing the filtered signal to a sample signal representative of a gravitational force of the earth; and
   detecting the lack of movement when the filtered signal corresponds to the sample signal.

14. The method of claim 1, further comprising, when the ascertained location is not within the scheduled end location:
   calculating an estimated time to reach the scheduled end location based on a distance from the ascertained location; and
   repeating the ascertaining of the location of the mobile device based on the calculated estimated time.

15. The method of claim 1, further comprising repeating the ascertaining of the location of the mobile device at predetermined intervals until the ascertained location is the scheduled end location.

16. A non-transitory machine readable storage medium having program instructions, which when executed by a processing device of a mobile device causes the mobile device to perform a method of triggering a survey, the method comprising:
   identifying a scheduled end time and a scheduled end location for a carpool participant from stored carpool scheduling data;
   ascertaining a location of a mobile device of the carpool participant within a predetermined time of the scheduled end time;
   determining that the carpool has been completed for the participant based on whether the ascertained location is within a predetermined distance of the scheduled end location;
   comparing an actual arrival time of the completed carpool at the scheduled end location to the scheduled end time;
   determining a timeliness of the completed carpool based on the comparing;
   selecting a question on the survey based on the determined timeliness of the completed carpool;
   detecting a lack of movement of the mobile computing device for a predetermined time period after the ascertained location is within the predetermined distance of the scheduled end location using a movement sensor; and displaying the survey with the selected question to the participant on a display screen of the mobile device in response to the lack of movement being detected for the predetermined time period.

17. A mobile device, comprising:
a movement sensor for detecting movement of the mobile device;
a display screen;
a non-transitory storage medium to store program instructions; and
a processing device configured to execute the program instructions to control the movement sensor and display screen for performing a method of triggering a survey, the method comprising:
identifying a scheduled end time and a scheduled end location for a carpool participant from carpool scheduling data;
ascertaining a location of the mobile device of the carpool participant within a predetermined time of the scheduled end time;
determining that the carpool has been completed for the participant based on whether the ascertained location is within a predetermined distance of the scheduled end location;
comparing an actual arrival time of the completed carpool at the scheduled end location to the scheduled end time;
determining a timeliness of the completed carpool based on the comparing;
selecting a question on the survey based on the determined timeliness of the completed carpool;
detecting a lack of movement of the mobile device for a predetermined time period after the ascertained location is within the predetermined distance of the scheduled end location using the movement sensor; and
displaying a carpool survey with the selected question to the participant on the display screen of the mobile device in response to the lack of movement being detected for the predetermined time period.

18. The mobile device of claim 17, further comprising:
a location sensor for ascertaining a location of the mobile device; and
a filter for reducing signal noise of signals from at least one of the movement sensor and the location sensor.

19. The mobile device of claim 18, wherein the location sensor is global positioning system sensor.

20. The method of claim 1, wherein upon the determined timeliness indicating that the completed carpool is late, the selected question includes an inquiry into a cause of the lateness of the completed carpool.

21. The method of claim 20, wherein the inquiry into the cause of the lateness of the completed carpool inquires into one or more of: an amount of traffic experienced by the carpool, or whether an accident occurred during the carpool.

22. The method of claim 1, wherein upon the determined timeliness indicating that the completed carpool is early, the selected question includes an inquiry into a cause of the earliness of the completed carpool.

23. The method of claim 22, wherein the inquiry into the cause of the earliness of the completed carpool inquires into one or more of: an amount of traffic experienced by the carpool, or a speed of a car performing the carpool.

24. The method of claim 1, wherein the predetermined time period is associated with leaving a car.

25. The method of claim 1, wherein the predetermined time period is selected by the user.

26. The method of claim 25, wherein the predetermined time period is associated with at least one of: walking to a specified destination, or completing a specified activity.

27. A method for triggering a survey on a mobile device at an end of a carpool, the method performed by the mobile device and comprising:
identifying a scheduled end time and a scheduled end location for a carpool participant from stored data;
ascertaining a location of the mobile device within a predetermined time of the scheduled end time;
determining that the carpool has been completed for a participant based on whether the ascertained location of the mobile device is within a predetermined distance of the scheduled end location;
comparing an actual arrival time of the completed carpool to the scheduled end time;
determining a timeliness of the completed carpool based on the comparing;
selecting a question on the survey based on the determined timeliness of the completed carpool;
detecting a lack of movement of a mobile device of the participant for a predetermined time period after the carpool has completed; and
displaying the selected question of the survey on a display screen of the mobile device in response to the lack of movement being detected for the predetermined time period.

28. The method of claim 27, further comprising:
receiving by the mobile device a participant supplied answer to the selected question; and
transmitting by the mobile device the participant supplied answer to a server.

29. The method of claim 27, wherein the selecting selects a first question when the determined timeliness indicates that the completed carpool was late, and selects a second question when the determined timeliness indicates that the completed carpool was early, the second selected question being different from the first selected question.

30. A non-transitory machine readable storage medium having program instructions, which when executed by a processor of a mobile device perform a method of triggering a survey by a mobile device, the method comprising:
identifying a scheduled end time and a scheduled end location for a carpool participant from stored data;
ascertaining a location of the mobile device within a predetermined time of the scheduled end time;
determining that the carpool has been completed for a participant based on whether the ascertained location of the mobile device is within a predetermined distance of the scheduled end location;
comparing an actual arrival time of the completed carpool to the scheduled end time;
determining a timeliness of the completed carpool based on the comparing;
selecting a question on the survey based on the determined timeliness of the completed carpool;
detecting a lack of movement of a mobile device of the participant for a predetermined time period after the carpool has completed; and
displaying the selected question of the survey on a display screen of the mobile device in response to the lack of movement being detected for the predetermined time period.

31. The non-transitory machine readable storage medium of claim 30, the method further comprising:
receiving by the mobile device a participant supplied answer to the selected question; and transmitting by the mobile device the participant supplied answer to a server.

32. The non-transitory machine readable storage medium of claim 30, wherein the selecting selects a first question when the determined timeliness indicates that the completed carpool was late, and selects a second question when the determined timeliness indicates that the completed carpool was early, the second selected question being different from the first selected question.

33. The method of claim 1, further comprising:
 receiving by the mobile device a participant supplied answer to the selected question; and
 transmitting by the mobile device the participant supplied answer to a server.

34. The method of claim 1, wherein the selecting selects a first question when the determined timeliness indicates that the completed carpool was late, and selects a second question when the determined timeliness indicates that the completed carpool was early, the second selected question being different from the first selected question.

* * * * *